United States Patent
Leung

(10) Patent No.: US 11,844,455 B2
(45) Date of Patent: *Dec. 19, 2023

(54) FOOD STEAMER

(71) Applicant: CONAIR LLC, Stamford, CT (US)

(72) Inventor: Yau Shan Bernadette Leung, North Point (HK)

(73) Assignee: CONAIR, LLC, Stamford, CT (US)

( * ) Notice: Subject to any disclaimer, the term of this patent is extended or adjusted under 35 U.S.C. 154(b) by 429 days.

This patent is subject to a terminal disclaimer.

(21) Appl. No.: 16/656,782

(22) Filed: Oct. 18, 2019

(65) Prior Publication Data

US 2020/0046157 A1    Feb. 13, 2020

Related U.S. Application Data

(63) Continuation of application No. 14/935,605, filed on Nov. 9, 2015, now Pat. No. 11,589,700.

(51) Int. Cl.
*A47J 27/04* (2006.01)
*A47J 27/00* (2006.01)
*A47J 43/07* (2006.01)

(52) U.S. Cl.
CPC ............. *A47J 27/04* (2013.01); *A47J 27/004* (2013.01); *A47J 43/0772* (2013.01); *A47J 2027/043* (2013.01)

(58) Field of Classification Search
CPC ...... A47J 27/04; A47J 27/004; A47J 43/0772; A47J 2027/043
USPC ................................... 99/330, 403, 410, 417
See application file for complete search history.

(56) References Cited

U.S. PATENT DOCUMENTS

| | | | | |
|---|---|---|---|---|
| 2,500,219 | A * | 3/1950 | Troupe | A47J 27/16 219/399 |
| 4,823,767 | A * | 4/1989 | Wust | A47J 27/16 126/20 |
| 5,786,577 | A * | 7/1998 | Han | H05B 3/0004 219/682 |
| 6,506,545 | B1 * | 1/2003 | Bulliard | G03C 1/775 430/429 |
| 7,759,615 | B2 * | 7/2010 | Ando | A21B 3/04 219/401 |
| 2005/0268790 | A1 * | 12/2005 | Baldacci | A47J 31/306 99/285 |
| 2006/0182862 | A1 * | 8/2006 | Ely | A47J 37/0871 426/523 |

(Continued)

FOREIGN PATENT DOCUMENTS

FR    2586922 A1 *    3/1987

OTHER PUBLICATIONS

Machine translation of FR 2586922 performed on May 31, 2022.*

*Primary Examiner* — Tu B Hoang
*Assistant Examiner* — Alba T Rosario-Aponte
(74) *Attorney, Agent, or Firm* — Grogan, Tuccillo & Vanderleeden, LLP

(57) ABSTRACT

A food steamer includes a base, a cooking container receivable by said base, a lid receivable atop said cooking container, a boiler housed within the base, a steam flow pathway extending from said boiler to said lid for directing steam generated by said boiler into said container through said lid, a control unit configured to control operation of said food steamer in response to a user input. The control unit is configured to automatically deactivate the boiler when the lid is removed from the cooking container.

7 Claims, 17 Drawing Sheets

(56) References Cited

U.S. PATENT DOCUMENTS

| | | | |
|---|---|---|---|
| 2009/0212044 A1* | 8/2009 | Stanton | A47J 36/321 219/682 |
| 2010/0089251 A1* | 4/2010 | Veltrop | A47J 27/04 99/467 |
| 2012/0073450 A1* | 3/2012 | Constans | A47J 27/04 99/339 |
| 2016/0220058 A1* | 8/2016 | Rocklinger | A23L 5/13 |

* cited by examiner

FOOD STEAMER

CROSS REFERENCE TO RELATED APPLICATIONS

This application is a continuation application of U.S. patent application Ser. No. 14/935,605 filed on Nov. 19, 2015, which is incorporated hereto by reference in its entirety.

FIELD OF THE INVENTION

The present invention relates to food processing devices and, more particularly, to a food steamer for steam cooking foods.

BACKGROUND OF THE INVENTION

Steamer appliances which cook foods using steam generated therein by electric heaters are well known. Typically, such appliances have a heater within a base of the appliance that is configured to convert water into steam. The produced steam is directed to an inlet in the bottom of a container receivable on the base, such that the steam is permitted to enter the container from below in order to steam cook food items placed therein.

While existing steamer appliances are generally suitable for what is regarded as ordinary performance, there is still room for improvement. In particular, existing steamer appliances typically provide steam to the cooking container from below. This may lead to uneven cooking, especially for foods adjacent to the top of the container where the flow of steam may not consistently reach. Accordingly, it would be desirable to have a food steamer that more efficiently cooks foods, as well as provides an added level of safety and automated cooking capabilities.

SUMMARY OF THE INVENTION

It is an object of the present invention to provide a food steamer.

It is another object of the present invention to provide a food steamer whereby steam is provided to a cooking container through the lid of such container.

It is another object of the present invention to provide a food steamer configured to automatically interrupt the flow of steam when the lid is removed.

It is another object of the present invention to provide a food steamer having a plurality of user-selectable, preprogrammed cooking modes.

It is object of the present invention to provide a food steamer that cooks foods more efficiently than existing devices.

These and other objects are achieved by the present invention.

According to an embodiment of the present invention, a food steamer is provided. The food steamer includes a base, a cooking container receivable by said base, a lid receivable atop said cooking container, a boiler housed within the base, a steam flow pathway extending from said boiler to said lid for directing steam generated by said boiler into said container through said lid, a control unit configured to control operation of said food steamer in response to a user input. The control unit is configured to automatically deactivate the boiler when the lid is removed from the cooking container.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
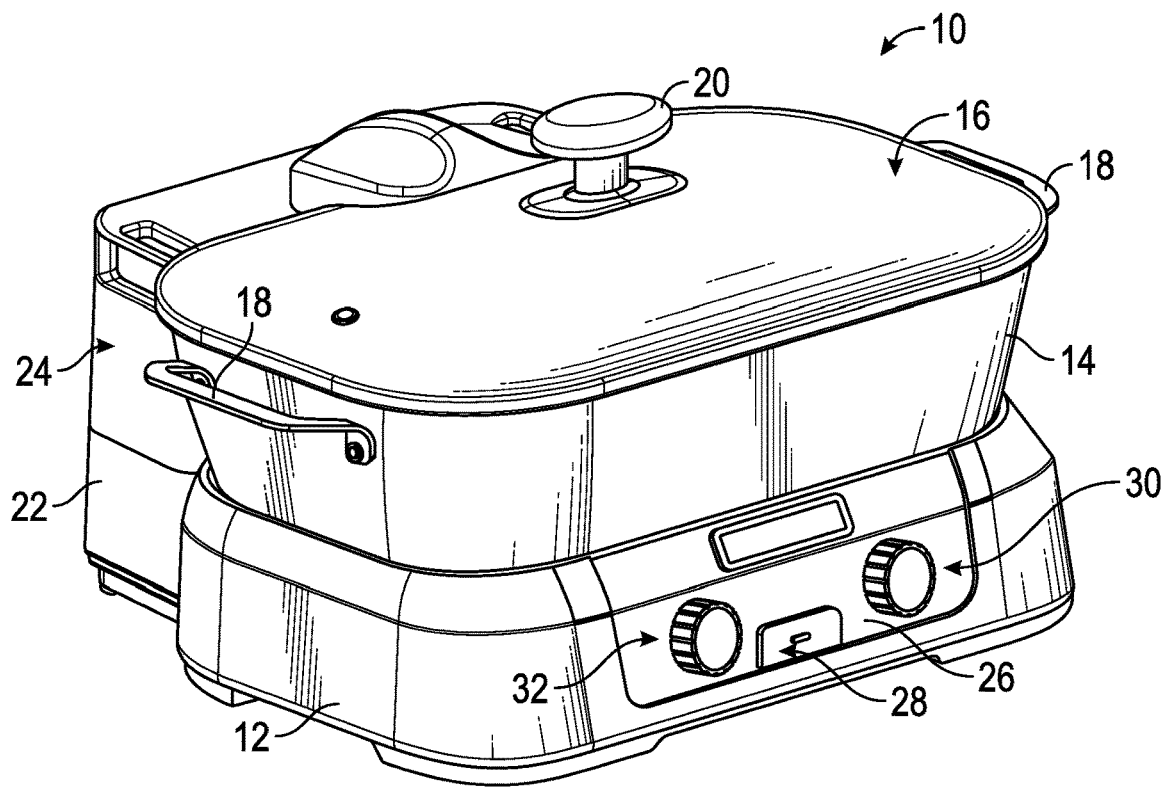
FIG. 1 is a front, perspective of a food steamer according to an embodiment of the present invention.
Figure 2:
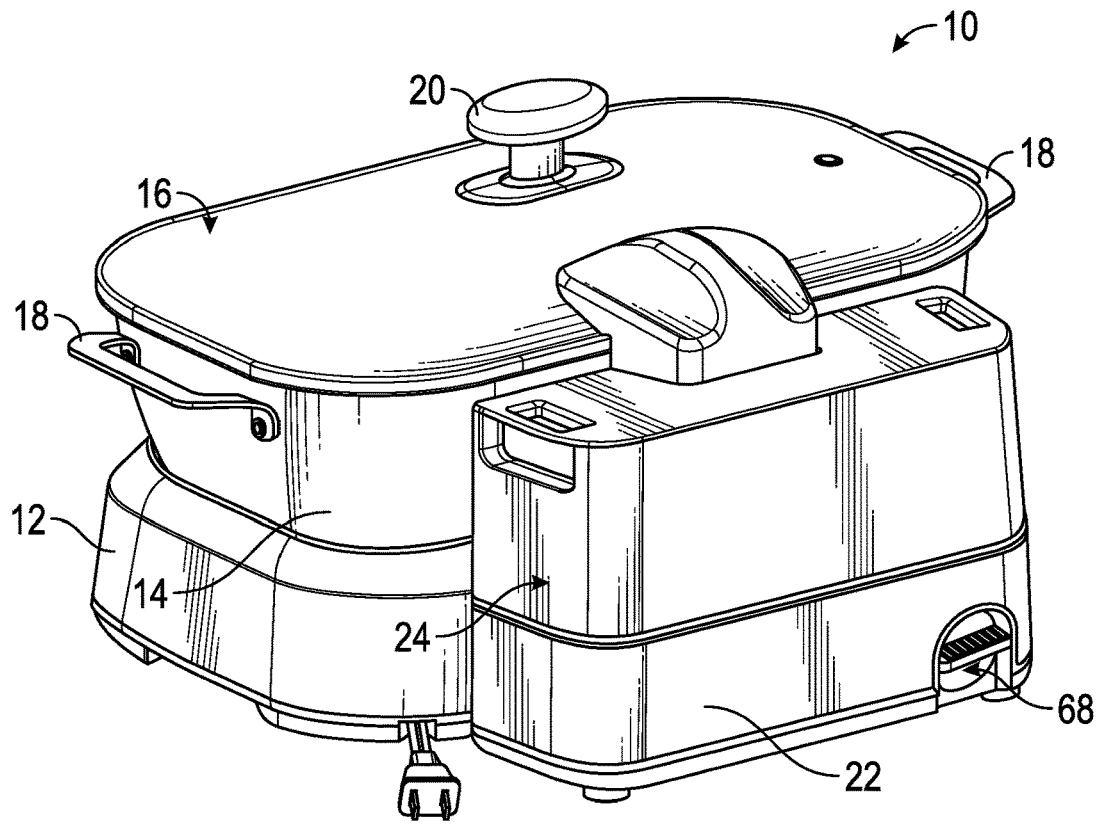
FIG. 2 is a rear, perspective view of the food steamer of FIG. 1.
Figure 3:
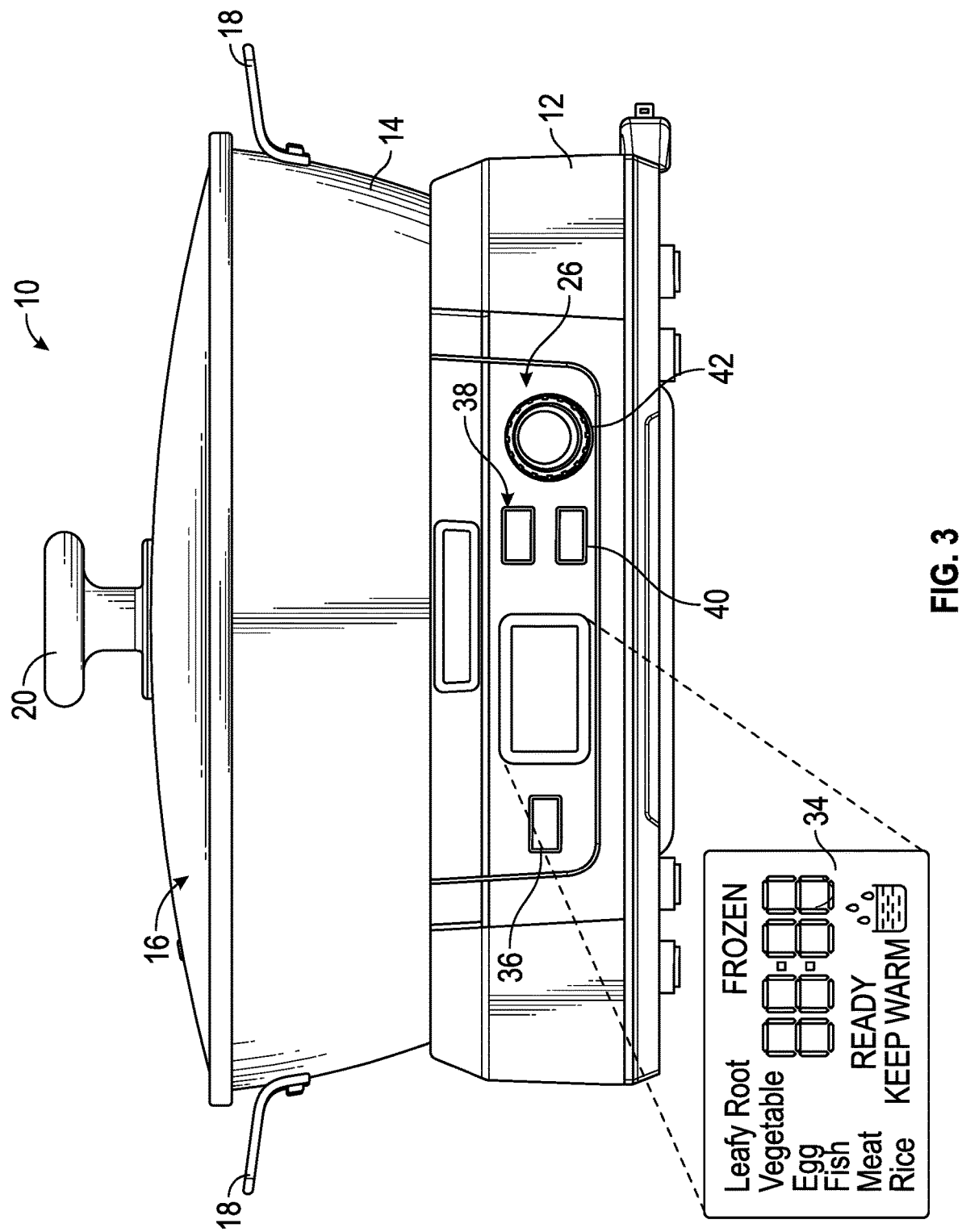
FIG. 3 is front view of the food steamer of FIG. 1.
Figure 4:
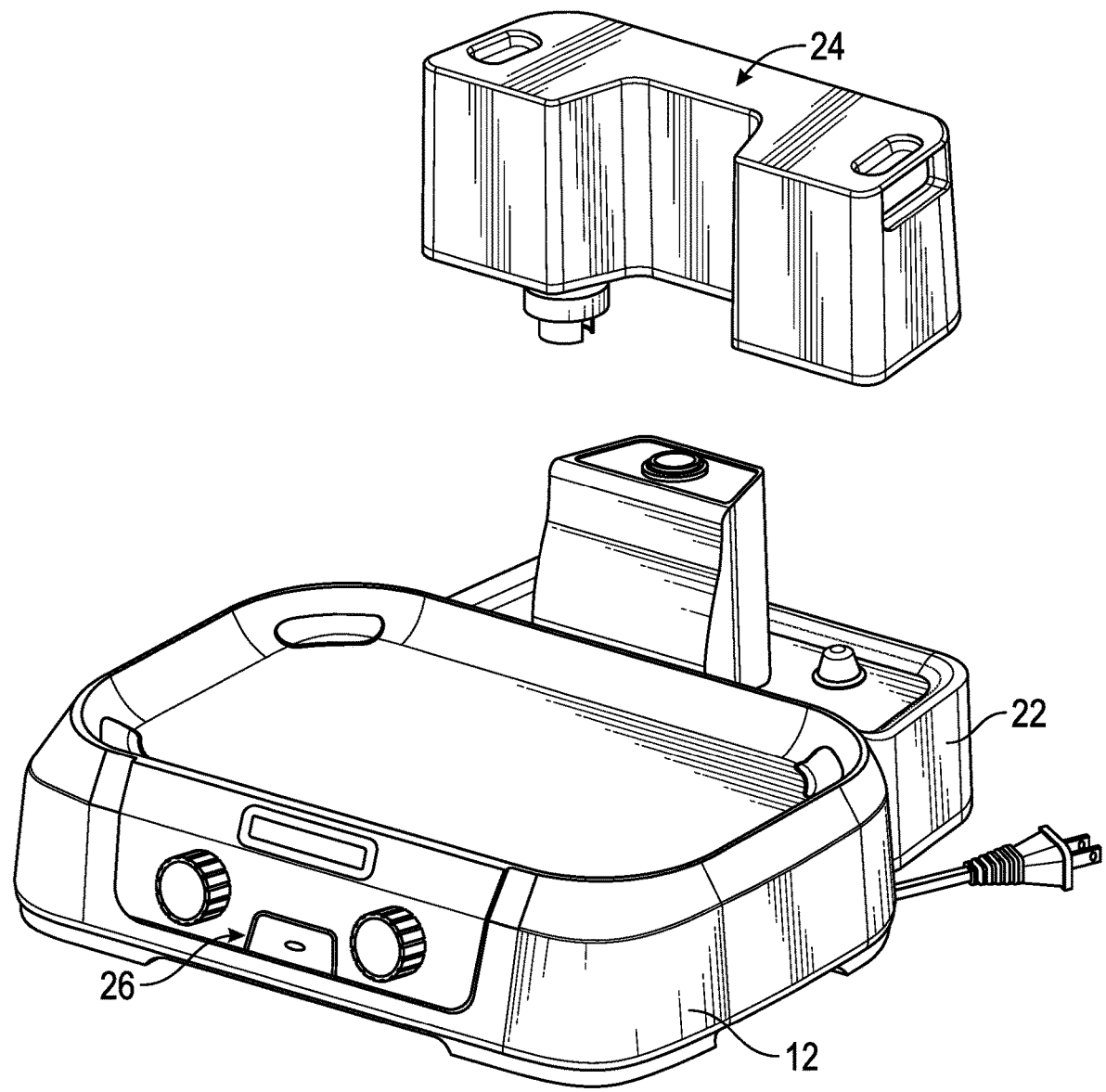
FIG. 4 is a perspective view of a base of the food steamer of FIG. 1.

Referring to FIGS. 1-3, a food steamer 10 according to an embodiment of the present invention is shown. The food steamer 10 includes a generally rectangular base 12, a removable cooking container 14 received atop the base, and a lid 16 receivable atop the cooking container 14. The cooking container 14 may include a pair of opposed handles 18 enabling a user to selectively position the container 14 on the base 12, or to remove the container 14 from the base 12. The lid 16 preferably includes a handle 20 centered thereon to enable a user to remove the lid from the container 14 to add food items to the container 14, as desired. A rear portion 22 of the base 12 is configured to receive a removable water tank 24. A front of the base 12 includes a control panel 26 having a plurality of buttons and/or knobs allowing for user setting and control of a cooking function, as discussed in detail below. For example, in an embodiment, the control panel 26 may include a power indicating light 28, a knob 30 for controlling steam time, and a knob 32 for controlling the heating elements of the food steamer 10.

With reference to FIG. 3, the control panel 26 preferably includes a LCD display 34 configured to display a food type, food characteristic (e.g., frozen, fresh, etc.) cooking mode and cooking time. The control panel 26 also includes a start/stop button 36 with an indicator, a reheat button 38 with an indicator, a program button 40 with an indicator, and a selector dial 42. The selector dial 42 may be utilized by a user to select the food type, cooking mode and cooking time. The control panel 26 is electrically coupled to a control unit 200 configured to control the heating elements of the food steamer 10 according to one or more user inputs. In an embodiment, the control unit is configured to carry out one of a plurality of user-selectable pre-programmed cooking modes. In this respect, a user may simply select a food type, whereby the control unit is programmed to execute a pre-programmed cooking mode corresponding to the type of food selected.

Figure 5:
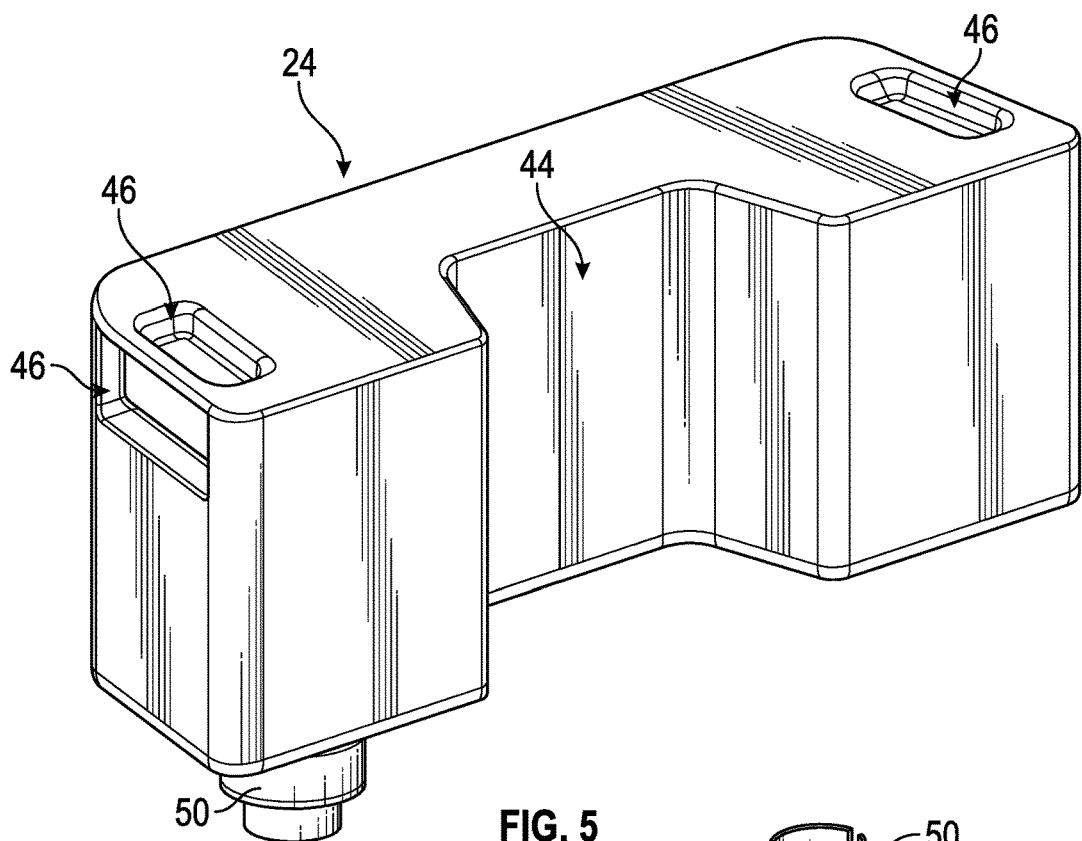
FIG. 5 is a top, perspective view of a water tank of the food steamer of FIG. 1.
Figure 6:
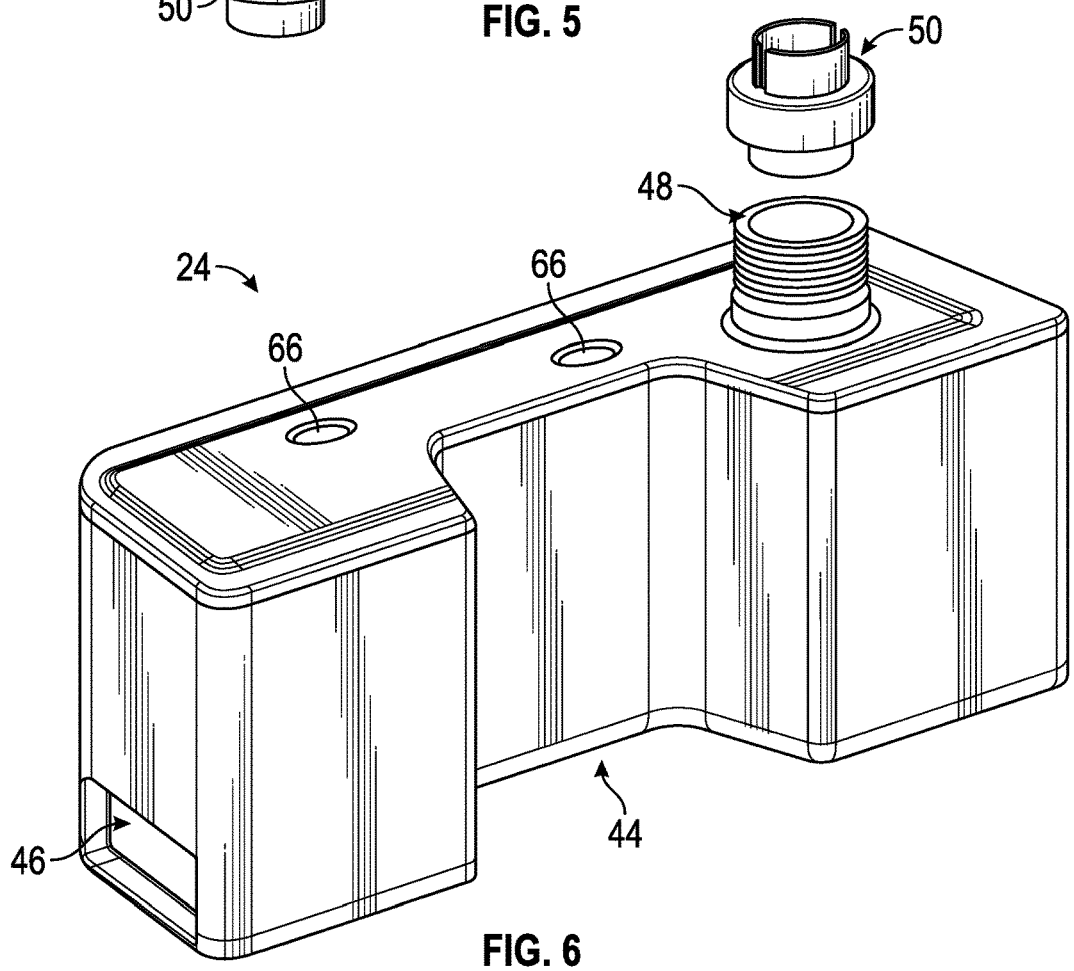
FIG. 6 is a bottom, perspective view of the water tank.
Figure 7:
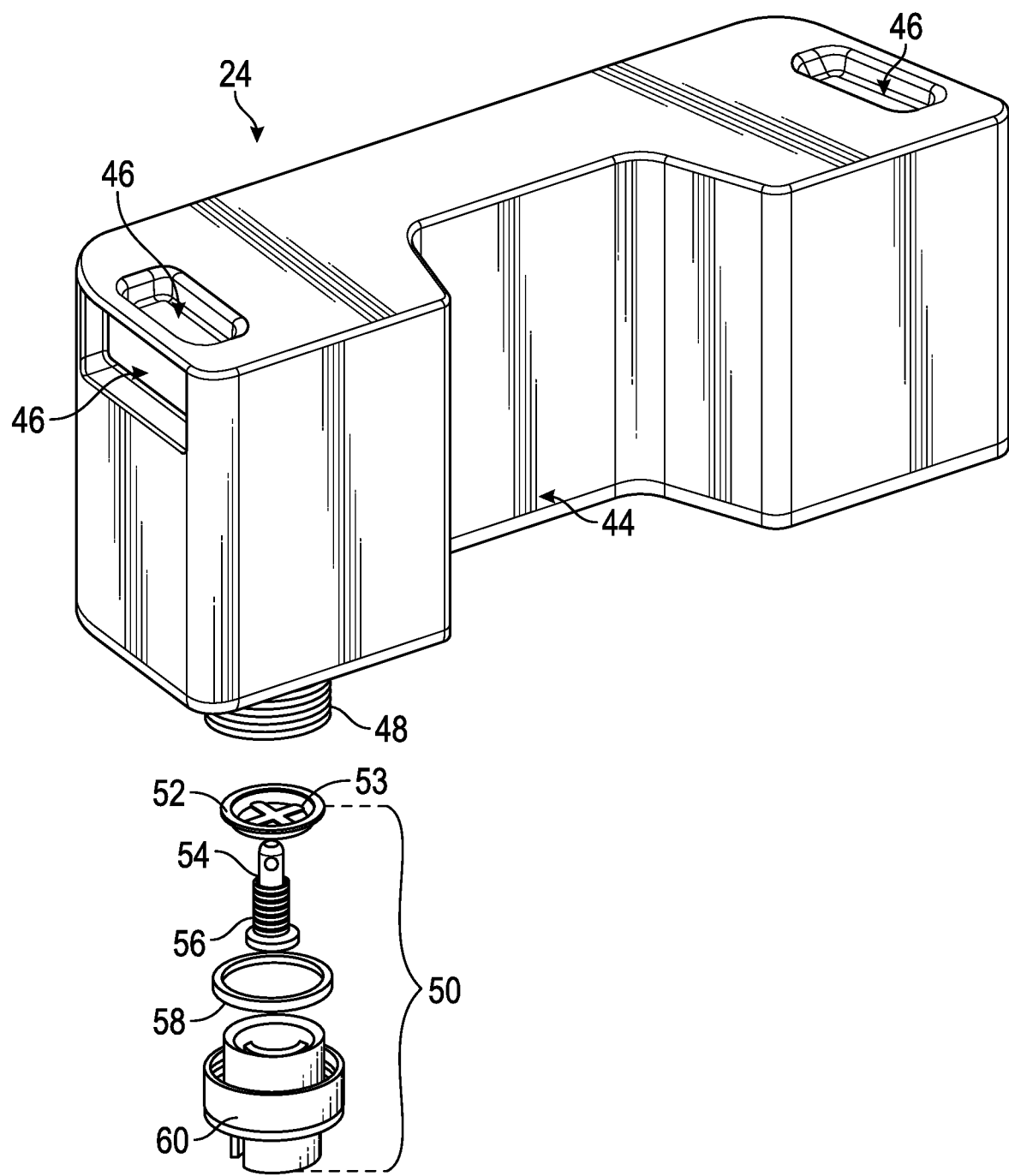
FIG. 7 is an exploded view of the water tank.

With reference to FIGS. 4-12 the base 12 and water tank 24 of the food steamer 10 are more clearly illustrated. As best shown in FIGS. 5-7, the water tank 24 is generally C-shaped and has a recessed area 44, the purpose of which will be discussed hereinafter. The water tank 24 includes a pair of opposed indents 46 formed at the top and side corners thereof that provide gripping areas enabling a user to more easily lift the water tank 24 from the base 12. The bottom of the water tank 24 includes a male threaded nipple 48 configured to threadedly receive a valve 50 thereon. Importantly, the valve 50 may be unscrewed from the nipple 48, enabling a user to fill the tank 24 with water.

With specific reference to FIG. 7, the valve 50 includes a silicone cap 52, a compression spring 54 received on a valve pin 56, a seal ring 58 and a valve cover 60. The silicone cap 52 includes an aperture 53 enabling the cap 52 to be mounted to a neck portion of the pin 56. The function of the valve 50 will be discussed in detail hereinafter.

Figure 8:
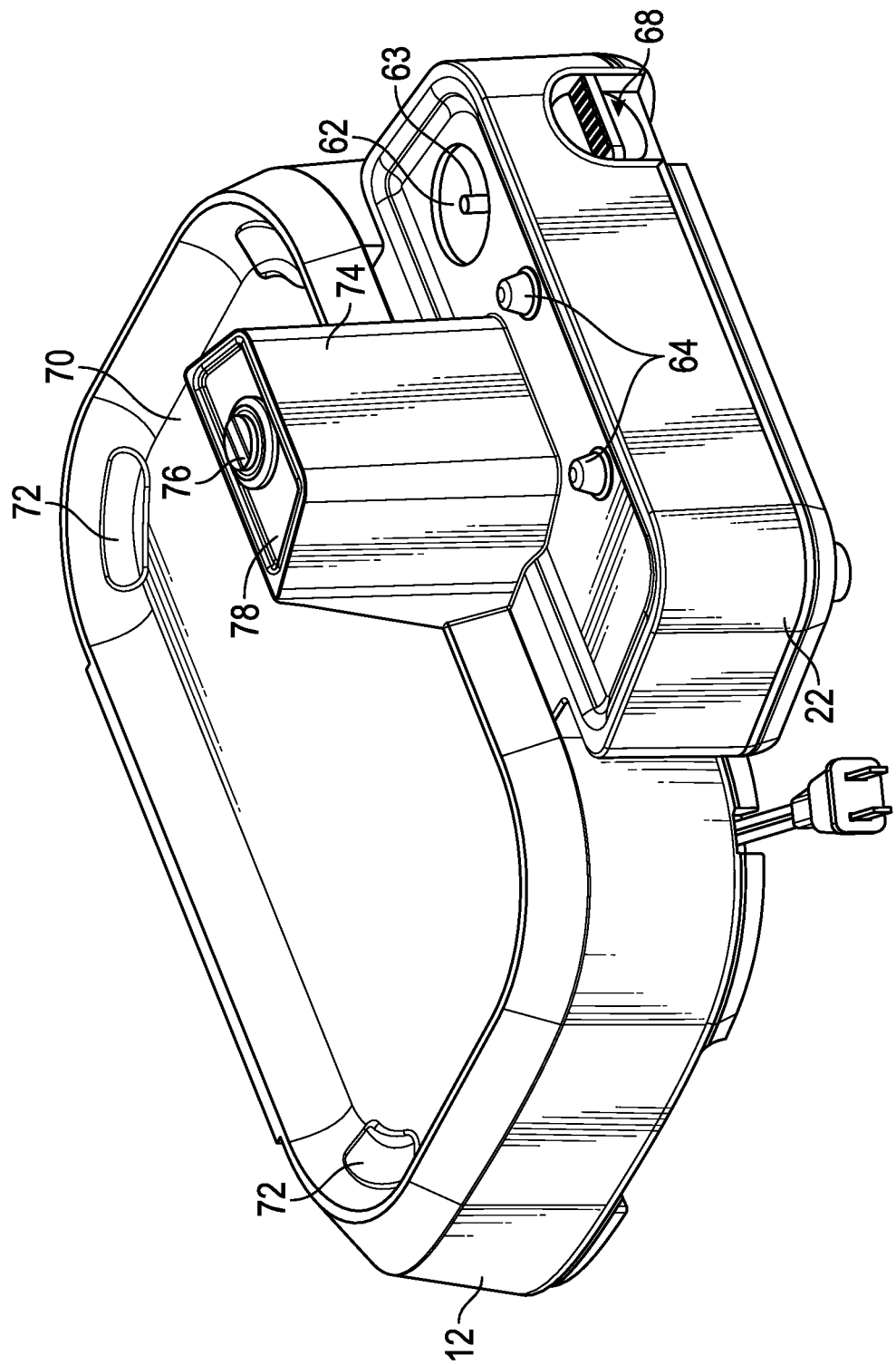
FIG. 8 is rear, perspective view of the base of the food steamer of FIG. 1, with the water tank removed.
Figure 9:
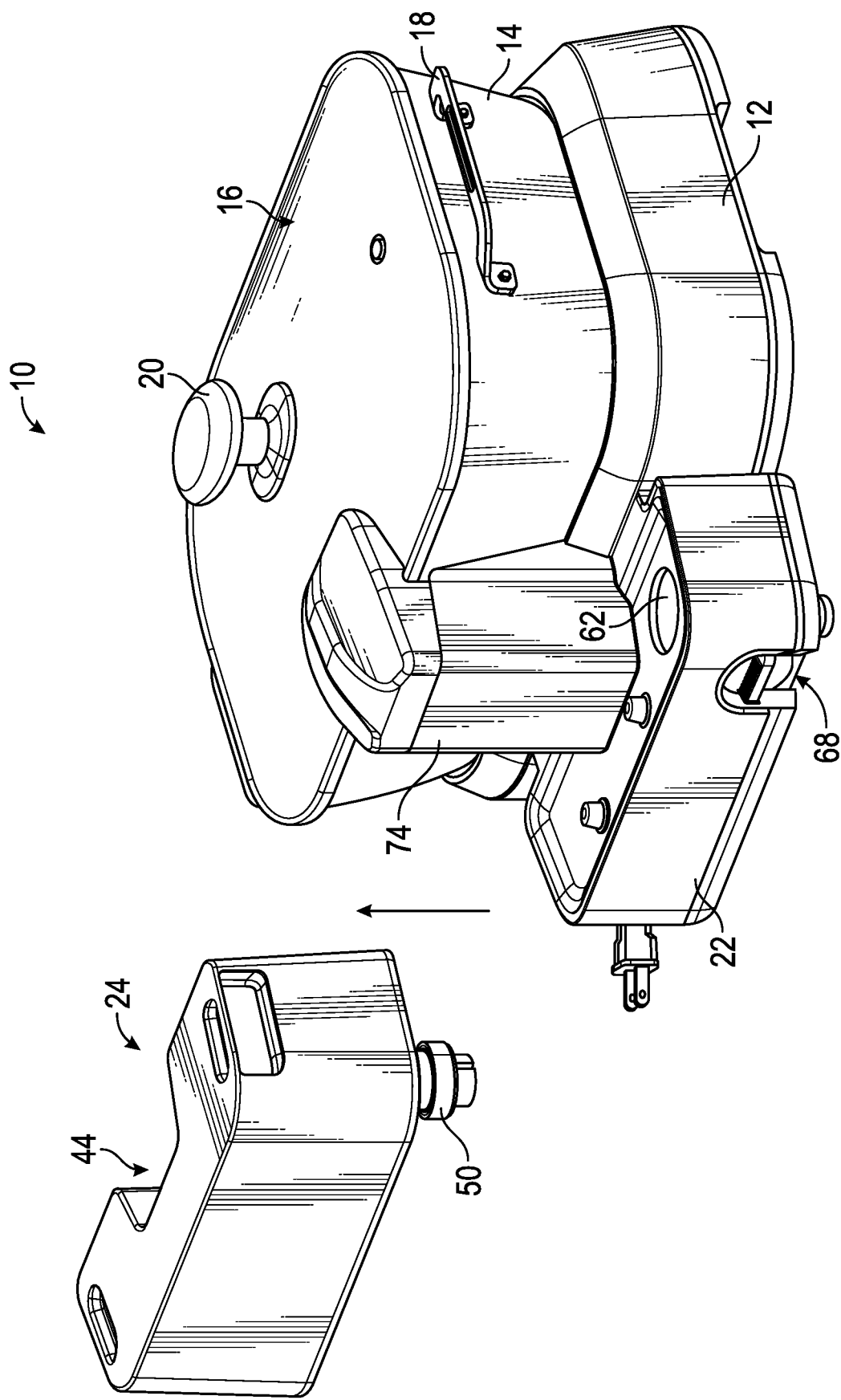
FIG. 9 is a perspective view illustrating removable of the water tank from the base.

As illustrated in FIGS. 8 and 9, the rear portion 22 of the base 12 includes an inlet aperture 62 configured to receive the valve 50 and nipple 48 of the water tank 24. The rear portion 22 also includes a plurality of locating projections 64 configured to be received in corresponding locating recesses 66 formed in the bottom of the tank 24 to assist a user in properly seating the water tank 24 upon the base 12. A back side of the rear portion 22 of the base 12 may also include a drain receiving a removable plug 68. The plug 68 may be selectively removed by a user to fully drain the food steamer 10 (i.e., all components thereof, including the boiler chamber) of water. As also illustrated in FIG. 8, the container-receiving portion 70 of the base 12 may include a plurality of silicone pads 72 atop of which the container 14 is configured to sit.

The base 12 of the food steamer 10 also includes a generally rectangular housing 74 extending upwards from the base 12, containing a steam flow channel. The housing 74 includes a steam outlet 76 of the steam flow channel at the top thereof. The steam outlet 76 is fluidly coupled to the boiler chamber housed in the base, as discussed below. Importantly, the housing 74 also includes a sensor 78 at the top thereof. The sensor 78 is configured to detect when the lid 16 is received atop the container 14 when the container 14 is positioned on the base 12. As shown in FIG. 9, the water tank 24 is receivable by the rear portion 22 of the base 12 such that the steam flow channel housing 74 is received by the recessed area 44 of the water tank 24. When received by the base 12, the projections 66 of the base are received by the recesses 68 in the bottom of the water tank 24, and the valve 50 is received in the inlet aperture 62 of the base.

Figure 10:
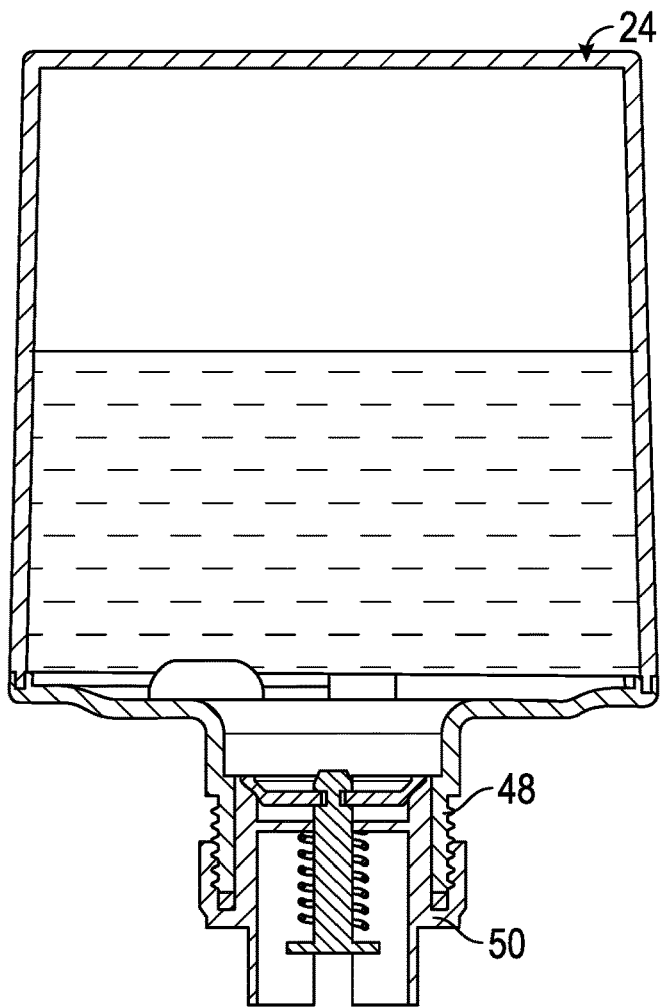
FIG. 10 is a cross-sectional view of the interface between the water tank and the base.
Figure 11:
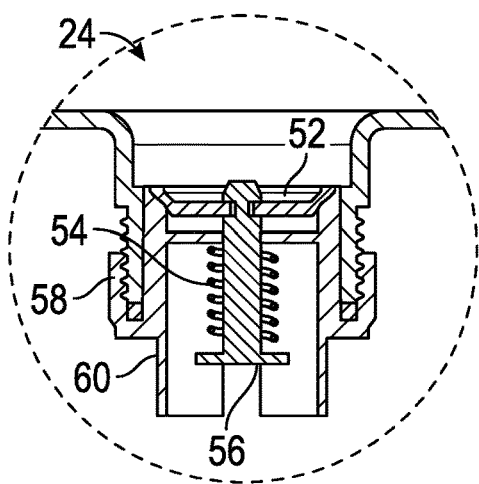
FIGS. 11 and 12 are enlarged, cross-sectional views of the interface of the water tank and the base.
Figure 12:
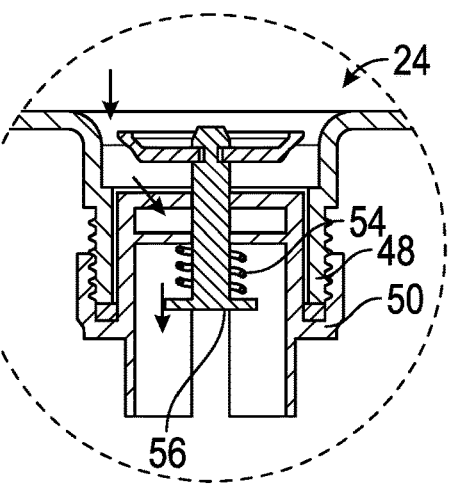
Figure 13:
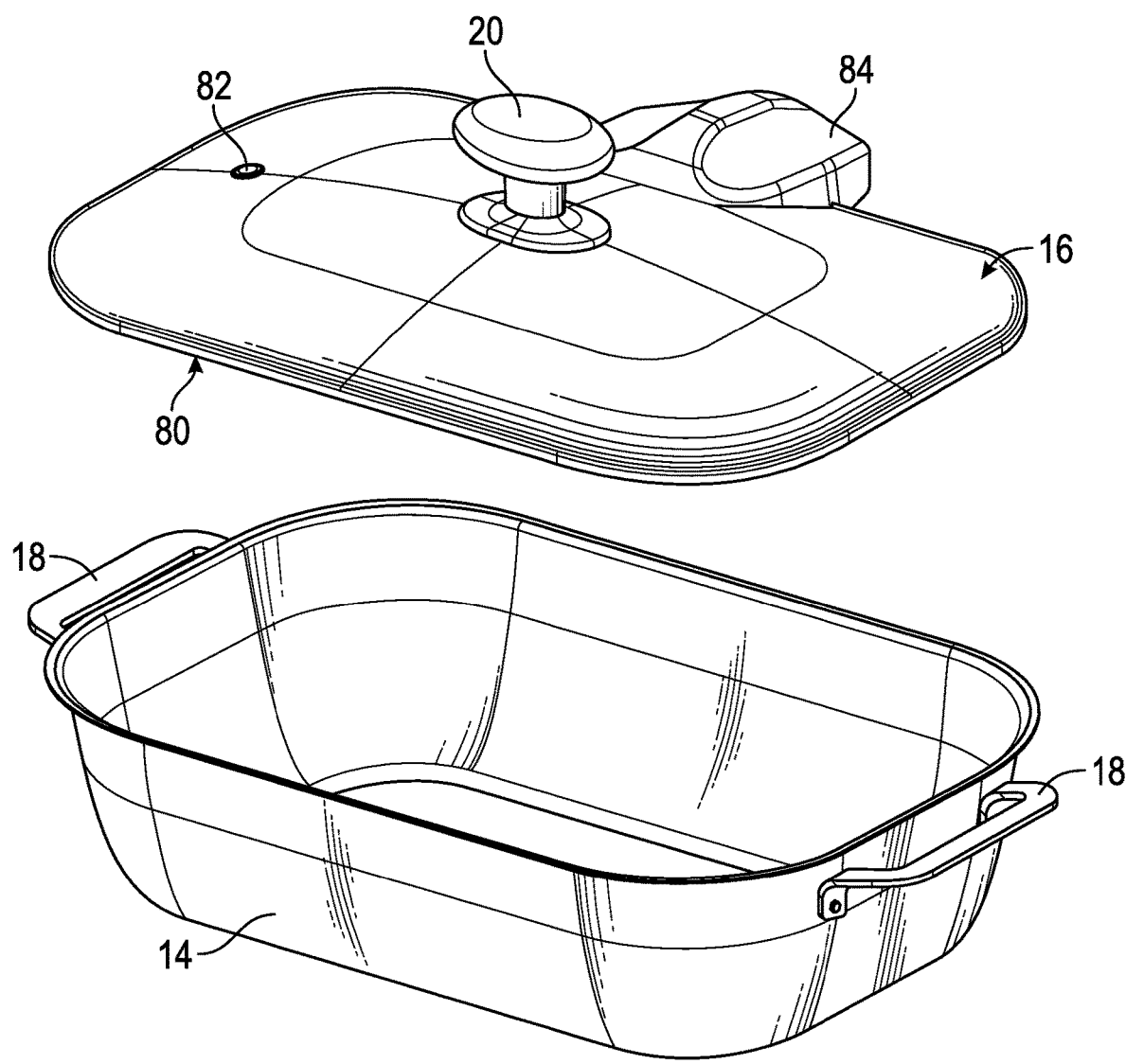
FIG. 13 is a perspective view of cooking container and lid of the food steamer of FIG. 1.

Turning now to FIGS. 10-12, detail views of the interface between the water tank 24 and the base 12 are shown. When the valve 50 and male nipple 48 are received within the inlet aperture 62 of the base 12, a stud 63 below the inlet aperture 62 contacts the bottom of the valve pin 56, urging the valve pin 56 upwards against the bias of the compression spring 54. This causes the silicone cap 52 to unseat from the valve cover 60, allowing water to flow out of the water tank 24 through the nipple 48, past the valve 50, and into the boiler chamber within the base 12, as represented by the arrows in FIG. 11. When not received on the base 12, the valve 50 automatically closes as shown in FIG. 11, preventing water within the tank 24 from exiting.

With reference to FIGS. 13-16 the cooking container 14 and lid 16 of the food steamer 10 are more clearly illustrated. In an embodiment, the container 14 is preferably formed from glass, although the container 14 may also be formed from stainless steel or other materials, without departing from the broader aspects of the present invention. The lid 16 may be likewise configured. Preferably, the lid 16 includes a stainless steel rim 80 and a steam vent 82.

Figure 14:
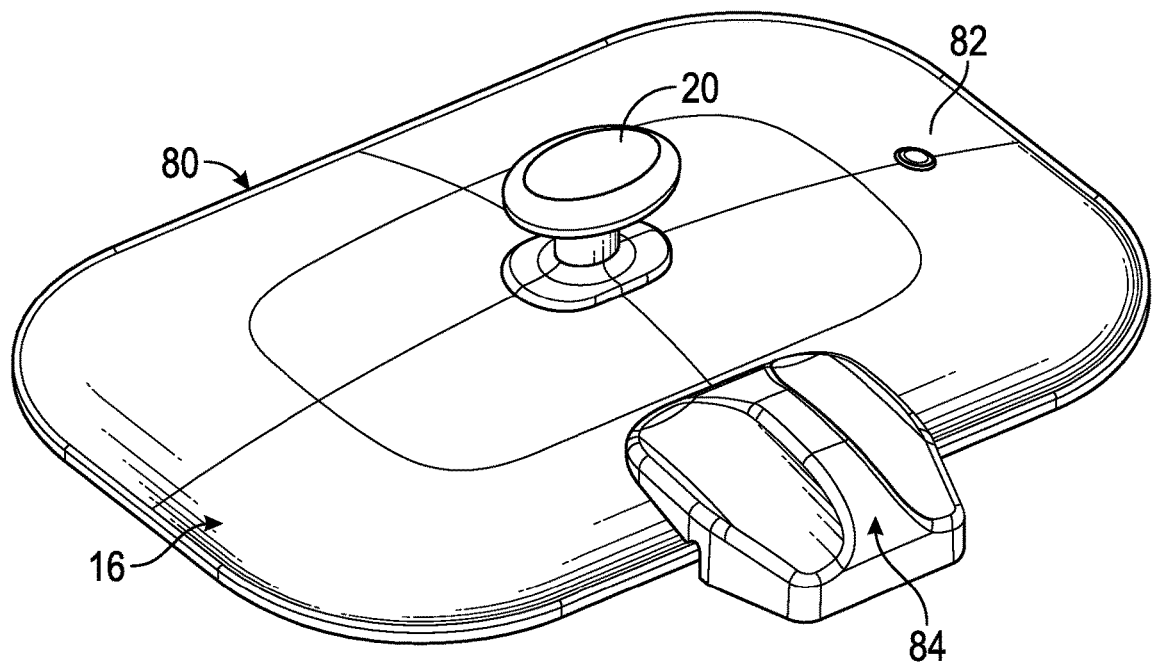
FIG. 14 is a perspective view of the lid of the food steamer.
Figure 15:
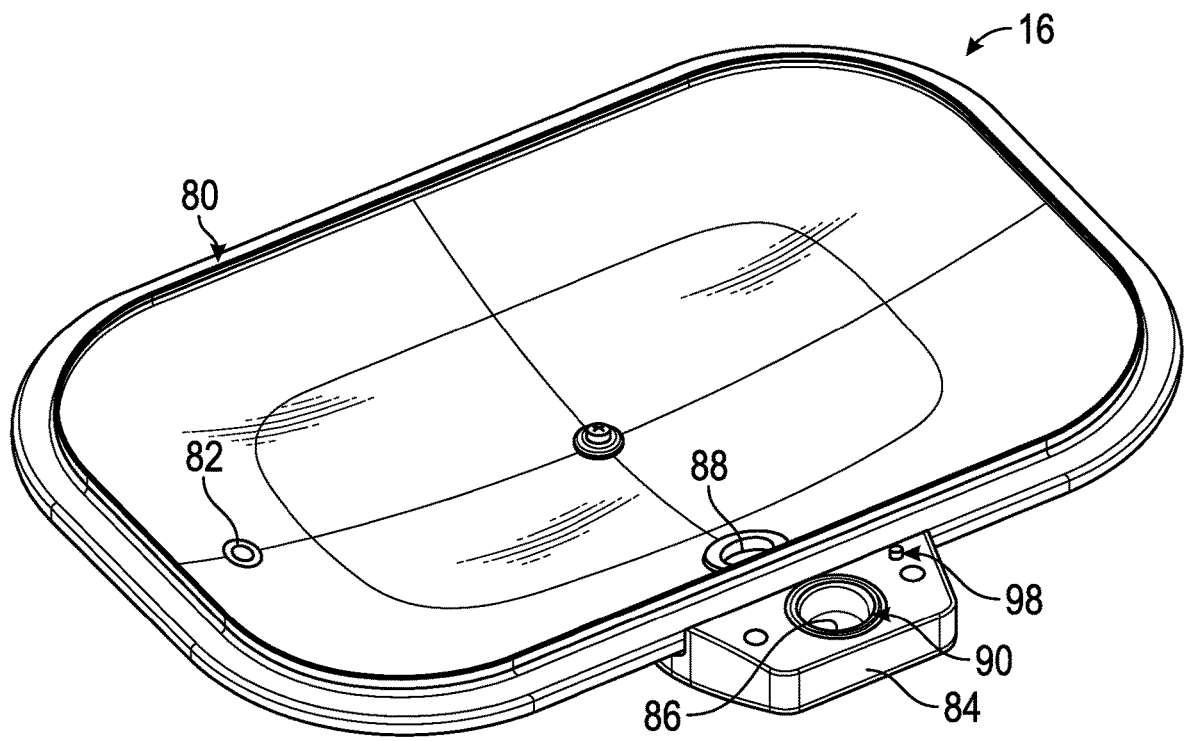
FIG. 15 is a perspective view of the underside of the lid of the food steamer.
Figure 16:
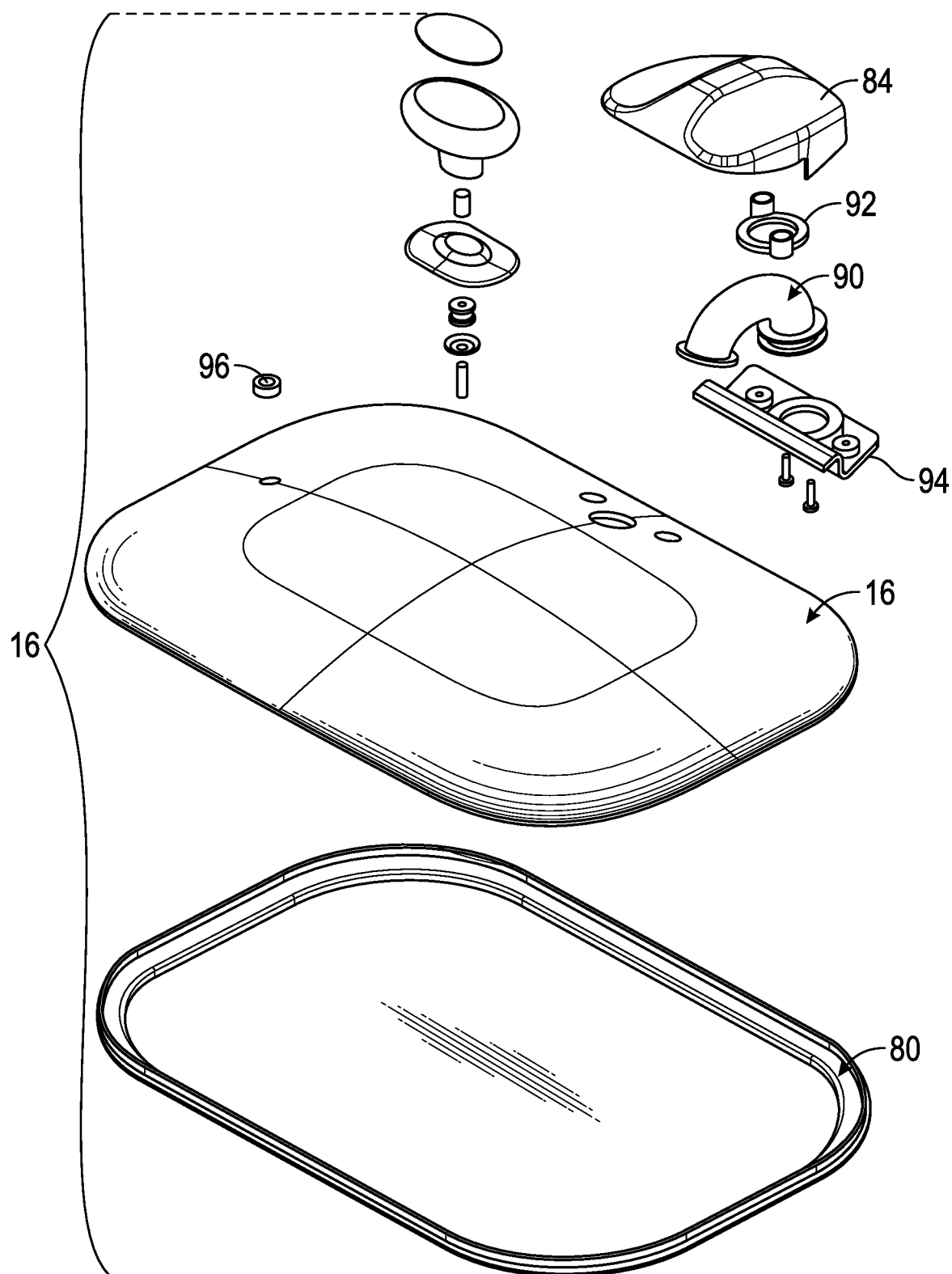
FIG. 16 is an exploded view of the lid of the food steamer.

As best illustrated in FIGS. 14-16, the lid 16 also includes a cover 84 housing a portion of the steam flow pathway. In connection with this, the lid 16 includes a steam inlet 86 configured to receive a flow of steam from the steam outlet 76 of the base 12. The steam inlet 86 is fluidly coupled to a steam outlet 88 formed in the lid 16 by a silicone steam tube 90. FIG. 16 illustrates the various components of the portion of the steam pathway of the lid 16. In particular, the steam pathway of the lid includes the cover 84, a mounting plate 92, the silicone steam tube 90 and a base plate 94. The vent 82 may be provided with a stainless steel ring 96.

Referring back to FIG. 15, the underside of the lid 16, on the bottom of the base plate 94, is formed with a pin 98. The pin 98 is configured to depress the sensor 78 on the base 12. In this manner, the control unit of the food steamer 10 is able to detect when the container 14 is placed atop the base 12 and the lid 16 is in place atop the container 14. This provides a safety feature in that the boiler will be disabled unless the presence of the lid 16 atop the container 14 is detected.

Figure 17:
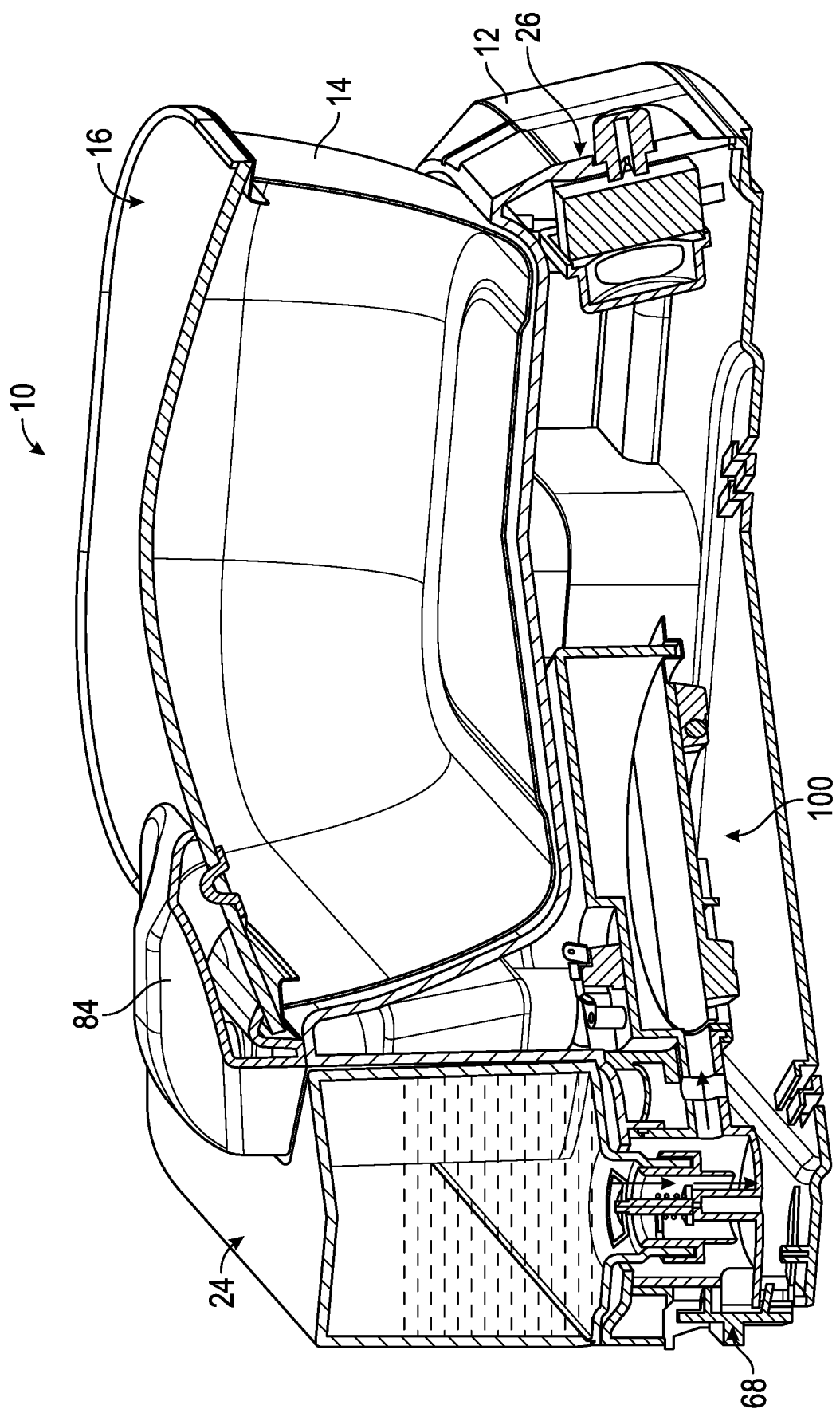
FIG. 17 is a perspective, cross-sectional view of the food steamer of FIG. 1, illustrating a path of travel of the water into the boiler.
Figure 18:
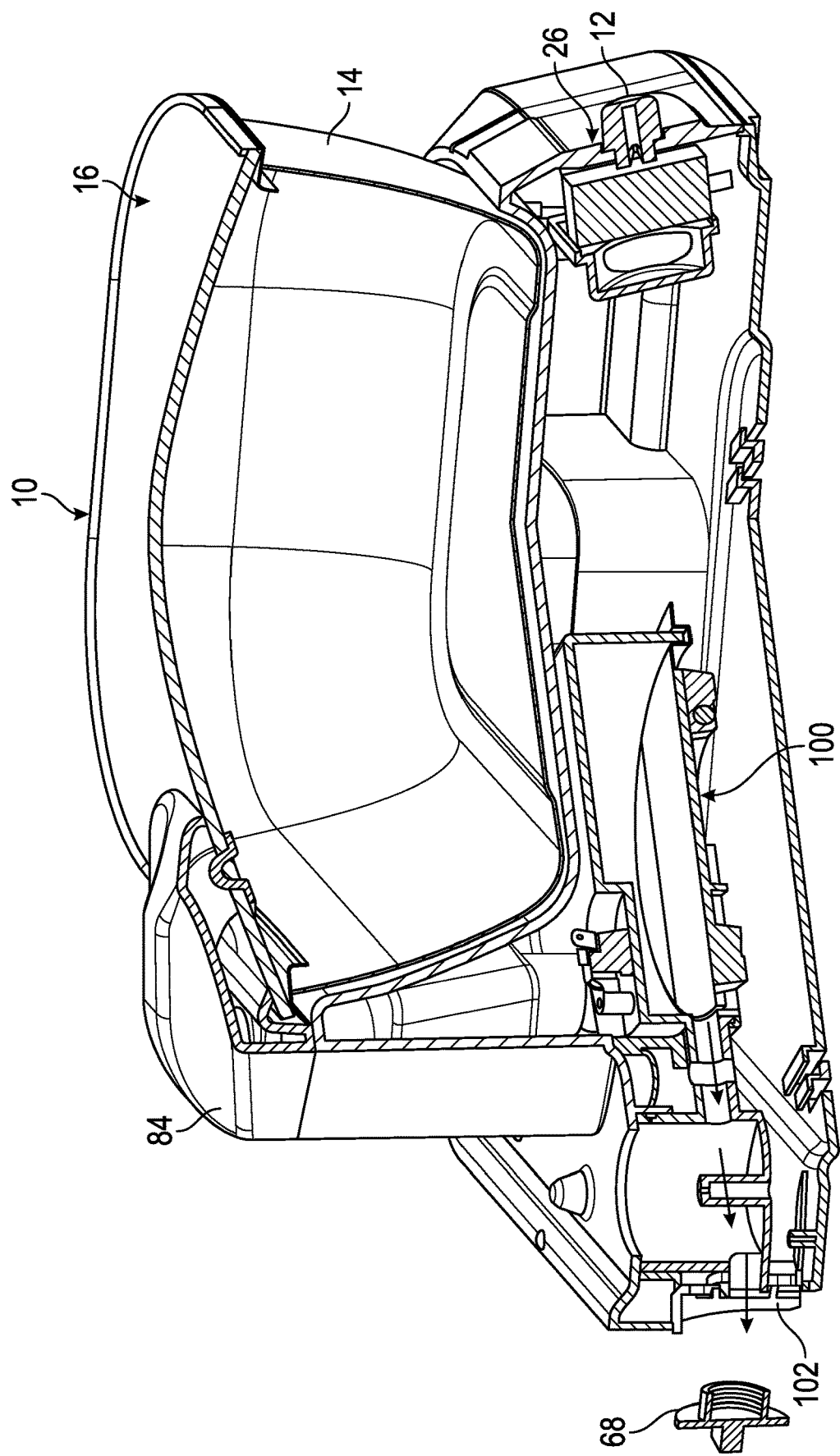
FIG. 18 is a perspective, cross-sectional view of the food steamer of FIG. 1, illustrating a path of travel of the water during a draining operation.

Referring now to FIGS. 17 and 18, the base 12 of the appliance includes a boiler 100 positioned therein. As shown in FIG. 17, once the water tank 24 is positioned on the base 12 in the manner described above, water is permitted to flow from the tank 24 into the boiler 100, as represented by the arrows. As shown in FIG. 18, the plug 68 may be selectively removed from the rear of the base 12 to enable all water to be drained from the steamer 10, including from the boiler 100. (The draining of water is represented by the arrows). The outlet that receives the plug 68 may be configured with a seal ring 102, to insulate against leaks.

Figure 20:
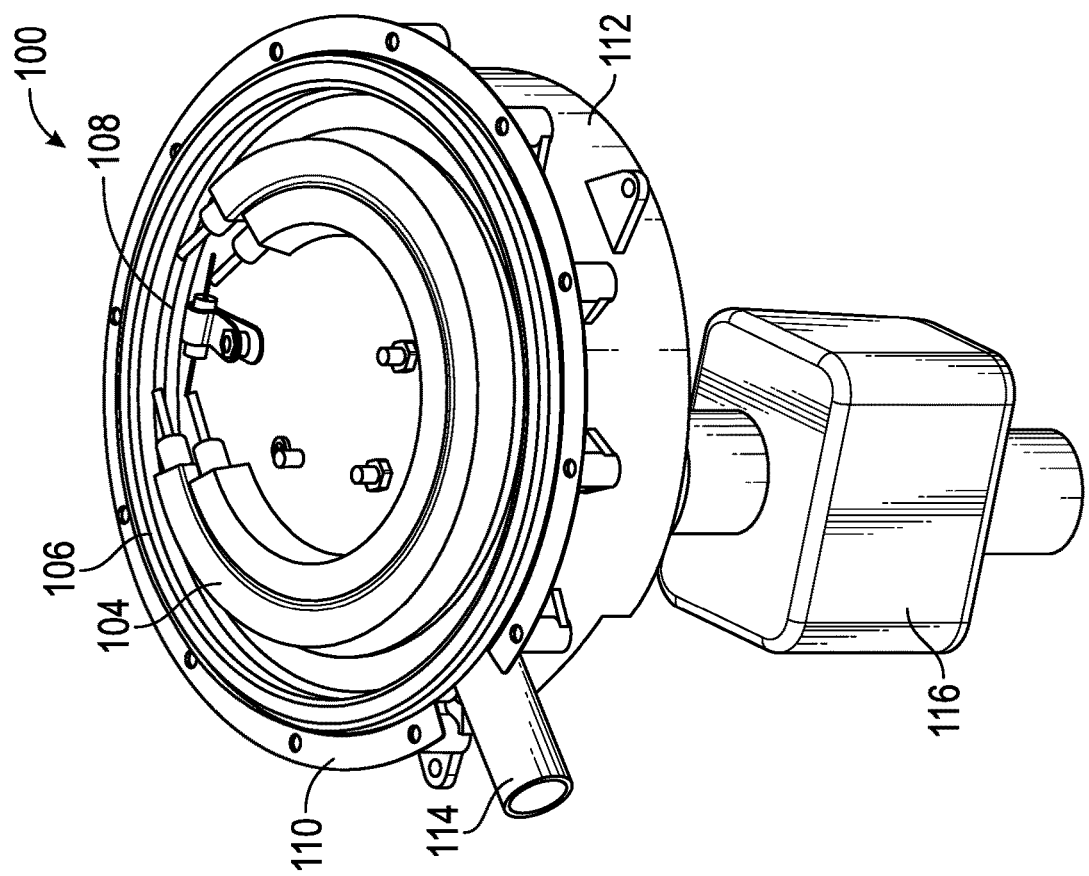
FIG. 20 is bottom, perspective view of the boiler chamber and buffer box.
Figure 19:
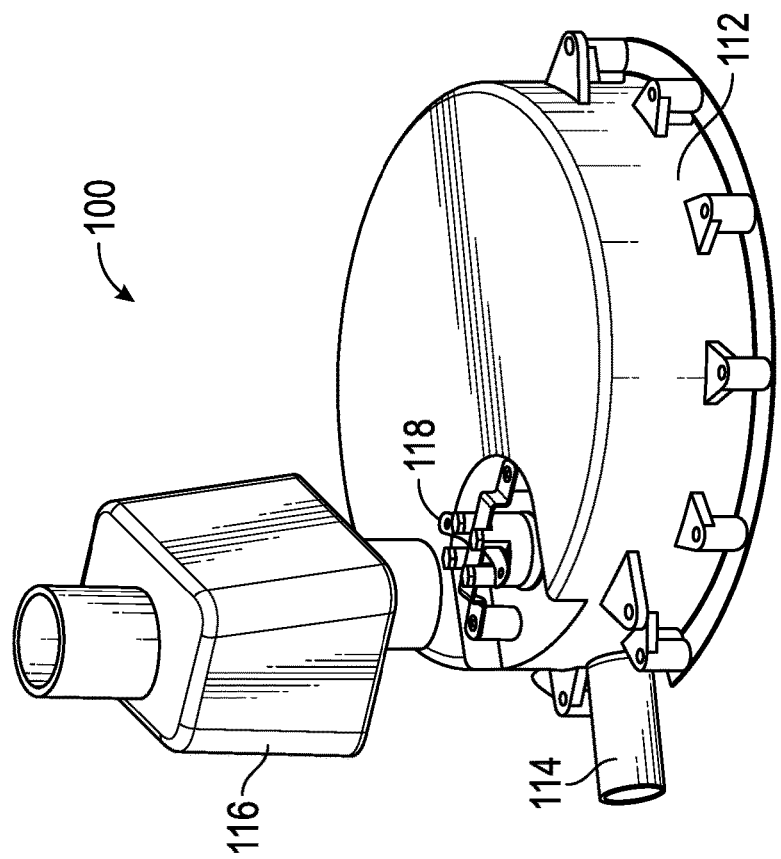
FIG. 19 is top, perspective view of a boiler chamber and buffer box of the food steamer of FIG. 1.
Figure 21:
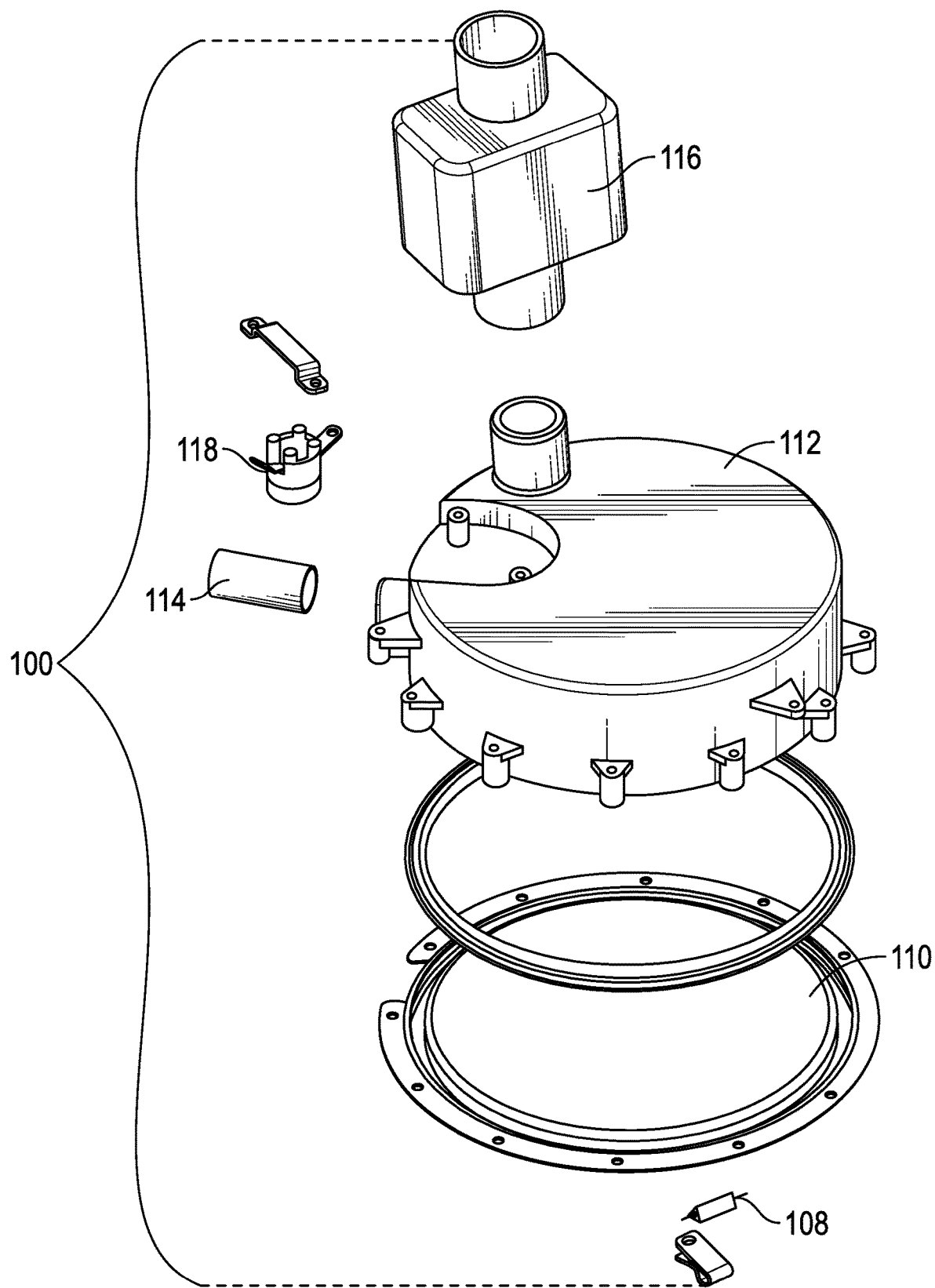
FIG. 21 is an exploded view of the boiler chamber and buffer box.

Turning now to FIGS. 19-21, the boiler 100 of the food steam 10 is more clearly illustrated. The boiler 100 may be any type of boiler commonly known in the art. In an embodiment, the boiler 100 preferably includes two brazing heating elements 104, 106 that are individually controllable (i.e., either one or both of the heating elements can be actuated). In an embodiment, the first heating element 104 is an 800 Watt brazing heating element and the second heating element 106 is a 1000 Watt heating element. The heating elements 104, 106 are electrically connected to a fuse 108. Both heating elements 104, 106 sit directly below a stainless steel boiler base 110 having a plastic cover 112 defining the chamber for receiving water. In connection with this, the boiler 100 also includes an inlet 114 for receiving water from the water tank 24, as discussed above in connection with FIG. 17. The boiler 100 also includes a buffer box 116 positioned above the chamber and in fluid communication with the chamber. A thermostat 118 may be included to regulate the temperature within the boiler 100.

Figure 22:
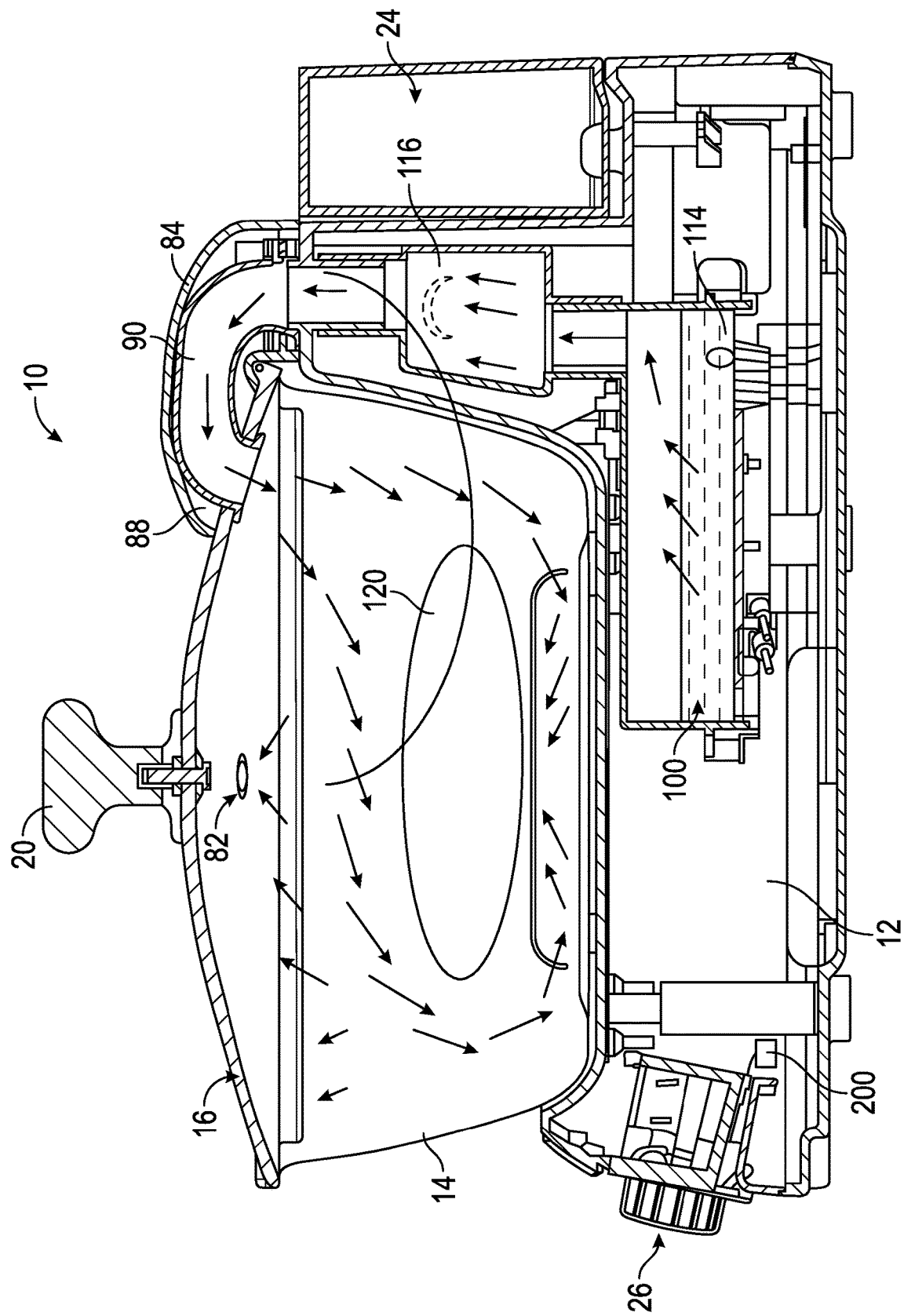
FIG. 22 is a cross-sectional view of the food steamer of FIG. 1, illustrating a steam flow path.

With reference to FIG. 22, operation of the food steamer 10 is illustrated. Once the water tank 24 is placed atop the base 12, water is permitted to enter the boiler 100 through inlet 114 as discussed above in connection with FIG. 17. Under control of the control unit, and in response to user inputs, the heating elements 104, 106 are activated to heat the base plate 110 of the boiler 100. The water is heated within the boiler 100 until it is converted into steam. As shown in FIG. 22, the steam then rises from the boiler chamber and enters the buffer box 116. The buffer box 116 functions as a condensing chamber, where some of the steam is permitted to condense and fall back into the boiler chamber. This ensures that only 'fine' steam travels upward and into the container 14 (i.e., it reduces water spray into the container). As shown therein, once exiting the buffer box 116, the steam travels through the steam tube 90 in the lid 16, and exits the steam outlet 88 in the lid 16 where it enters the container 14 from above. Due to gravity, the steam then travels downwardly where is surrounds a food item 120 within the container, thereby cooking the food item 120 evenly and quickly. As also shown therein, steam is permitted to exit the container 14 through vent 82, ensuring no over-pressure events that could potentially pose safety issues are created.

Figure 23:
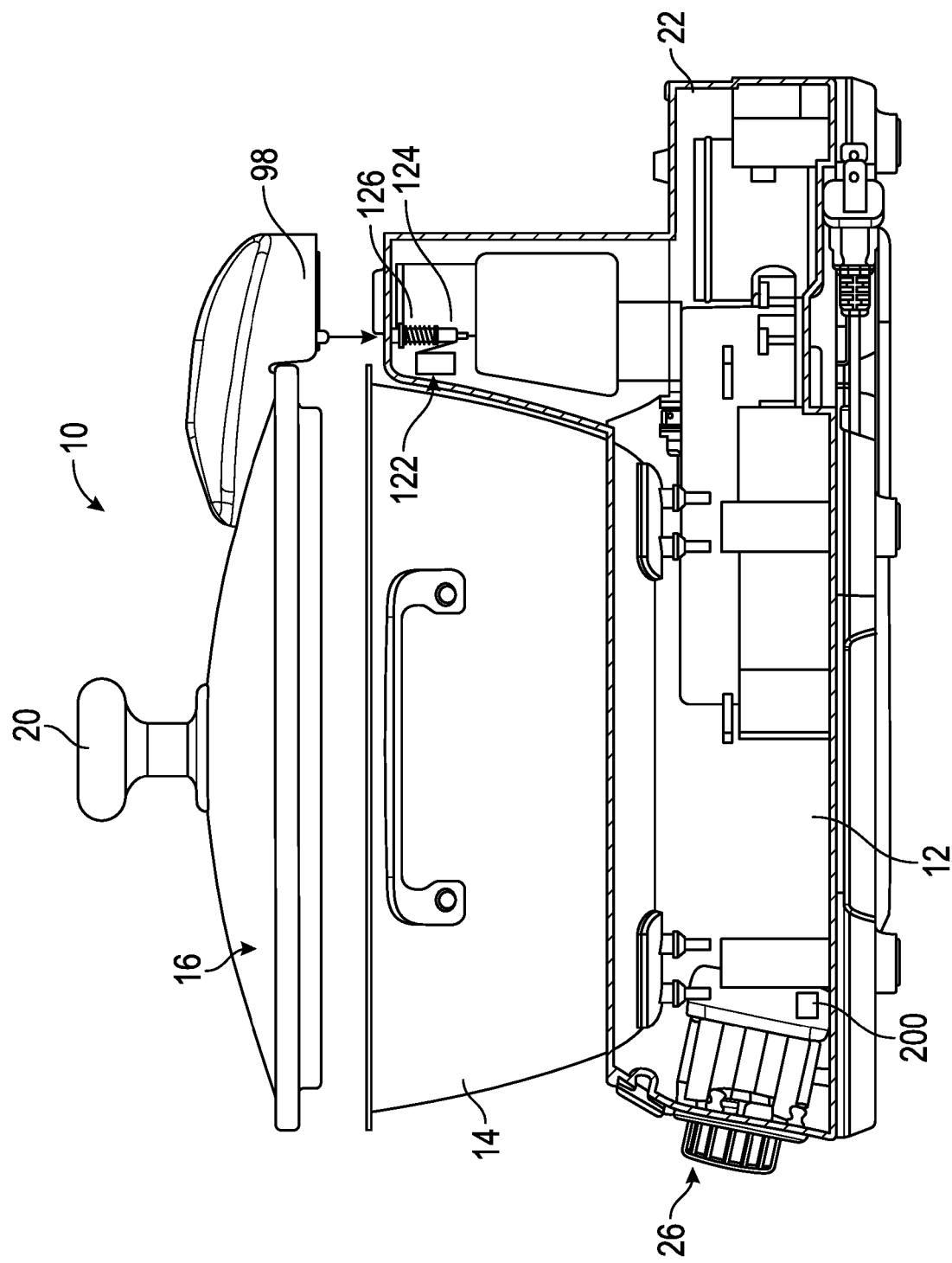
FIG. 23 is a partial-cross sectional view of the food steamer of FIG. 1.

A further safety feature is provided via the sensor 78 in the base. In particular, as shown in FIG. 23 the sensor 78 includes a micro switch 122, a sliding pin 124 and a compression spring 126 mating with the pin 124. When the lid 16 is placed atop the container 12, the pin 98 at the bottom, rear of the lid 16 is configured to depress the pin 124 against the spring bias, activating the micro-switch 122. The micro switch sends a signal to the control unit indicating that the lid is properly received atop the base, and that the boiler 100 can be activated. In the absence of such signal, the control unit maintains the boiler in a non-active state, even if the food steamer 10 is turned on by a user and a cooking mode selected. Importantly, this prevents steam from being produced unless the lid 16 is properly seated atop the container 14. In other embodiments, the sensor 78 may be a reed sensor, hall sensor or infrared sensor, without departing from the broader aspects of the present invention.

The present invention therefore provides a food steamer that is operable to cook food items via steam from above. In particular, due to the arrangement of the steam flow pathway, steam generated in the base travels upward and enters the cooking container through the lid, where it falls downwardly due to gravity and surrounds food items, thereby cooking them. Importantly, this provides a more efficient cooking method than existing appliances, which typically provide steam to food items from below. In addition, the presence of the buffer box ensures that substantially only steam enters the container by removing steam on the verge of transitioning back to water. Moreover, as discussed above, the present invention provides a variety of safety features. In particular, the vent in the lid ensures that the pressure within the container does not exceed a safe level. In addition, the lid detector sensor ensures that steam is not generated unless the lid is received atop the container.

In connection with the above, the food steamer 10 of the present invention allows a user to safely add food items to the container during a cooking operation. In particular, a first set of food items may be placed in the container and a steaming operation initiated. If a user desires to add additional food items to the container, the lid may be removed, which is sensed by the control unit. In response to sensing the removal of the lid, the control unit deactivates the boiler, thereby ceasing the generation and flow of steam. A user may then safely add food items to the container and replace the lid. Upon detecting the presence of the lid, the control unit may automatically activate the boiler once again to finish the steaming operation, as set by a user.

As indicated above, the food steamer 10 may be operated manually, i.e., to generate steam according to a user input (i.e., a duration of steaming). Alternatively, the food steamer 10 may carry out a cooking/steaming cycle automatically in response to a user selection of a pre-programmed cooking mode or food type. In a default mode of operation, the control unit is configured to activate both the 1000 Watt heating element 106 and the 800 Watt heating element 104 for a preset duration, until the boiler temperature reaches a predetermined temperature setting, and thereafter deactivate the 800 Watt heating element 104 in order to save energy (in which case the 1000 Watt heating element 106 is the only heating element in operation). Alternatively, a turbo function may be selected by a user, utilizing the control panel 26, in which both heating elements are activated until disabled. The food steamer 10 also includes a user-selectable reheat function in which just the 1000 Watt heating element 106 is activated.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food steamer, comprising:
    a base;
    a cooking container receivable by said base;
    a lid receivable atop said cooking container;
    a boiler housed within the base;
    a steam flow pathway extending from said boiler to said lid for directing steam generated by said boiler into said cooking container through said lid; and
    a control unit configured to control operation of said food steamer in response to a user input;
    wherein said lid includes a housing containing a portion of said steam flow pathway, said housing extending from a top of said lid beyond a peripheral edge of said lid;
    wherein said lid includes an outlet adjacent to a peripheral edge of said lid and in communication with said steam flow pathway for directing said steam into said cooking container through said lid, such that said steam exits said lid through said outlet and enters said cooking container adjacent to an upper edge of a sidewall of said cooking container; and
    said lid includes a steam release valve for permitting an egress of steam from said cooking container.

2. The food steamer of claim 1, further comprising:
a water reservoir receivable by said base, said water reservoir being in fluid communication with said boiler via a valve assembly.

3. The food steamer of claim 1, wherein:
said steam flow pathway includes a condensing chamber intermediate said boiler and said lid.

4. The food steamer of claim 1, further comprising:
a control panel for accepting said user input;
wherein said control unit is configured to carry out a pre-programmed cooking cycle in response to said user input.

5. The food steamer of claim 1, wherein:
said boiler includes a first heating element and a second heating element;
wherein said first and said second heating element are independently controllable.

6. A food steamer, comprising:
a base;
a cooking container receivable by said base;
a lid receivable atop said cooking container;
a boiler housed within the base;
a steam flow pathway extending from said boiler to said lid for directing steam generated by said boiler into said container through said lid;
a control unit configured to control operation of said food steamer in response to a user input; and
a condensing chamber located above said boiler along said steam flow pathway, said condensing chamber having an enlarged flow area as compared to said steam flow pathway;

wherein said condensing chamber is configured to receive rising steam from said boiler and to facilitate condensing of a portion of said rising steam within said condensing chamber, for direction back to said boiler; and
wherein said lid includes an outlet adjacent to a peripheral edge of said lid and in communication with said steam flow pathway, such that said steam exits said lid through said outlet and enters said cooking container adjacent to an upper edge of a sidewall of said cooking container.

7. A food steamer, comprising:
a base;
a cooking container receivable by said base for receiving a food item;
a lid receivable atop said cooking container;
a boiler housed within the base for heating water to generate steam;
a steam flow pathway outside of said cooking container, for directing said steam from said boiler into said container through said lid, such that said steam exits said lid adjacent to a sidewall of said cooking container and reaches said food item when it descends downwardly from said lid, and only thereafter reaching the top part of said food item;
wherein said lid includes an outlet adjacent to a peripheral edge of said lid and in communication with said steam flow pathway, such that said steam exits said lid through said outlet and enters said cooking container adjacent to an upper end of a sidewall of said cooking container.

* * * * *